(12) United States Patent
Hald et al.

(10) Patent No.: US 8,731,851 B2
(45) Date of Patent: May 20, 2014

(54) METHOD FOR RECONSTRUCTING AN ACOUSTIC FIELD

(75) Inventors: Jørgen Hald, Fredensborg (DK); Jesper Gomes, Frederiksberg (DK)

(73) Assignee: Bruel & Kjaer Sound & Vibration Measurement A/S, Naerum (DK)

( * ) Notice: Subject to any disclaimer, the term of this patent is extended or adjusted under 35 U.S.C. 154(b) by 317 days.

(21) Appl. No.: 13/002,918

(22) PCT Filed: Jun. 26, 2009

(86) PCT No.: PCT/EP2009/058036
§ 371 (c)(1),
(2), (4) Date: Mar. 29, 2011

(87) PCT Pub. No.: WO2010/003836
PCT Pub. Date: Jan. 14, 2010

(65) Prior Publication Data
US 2011/0172936 A1    Jul. 14, 2011

(30) Foreign Application Priority Data
Jul. 8, 2008 (DK) .......................... PA 2008 00956

(51) Int. Cl.
*G01H 3/12*       (2006.01)
*G06F 19/00*     (2011.01)

(52) U.S. Cl.
USPC .............................. 702/56; 73/646

(58) Field of Classification Search
CPC ............. G03H 3/00; H04R 5/00; G01H 1/46;
G01H 3/12; G01H 1/00; G01H 1/08; G01H
5/00; G01H 9/00; G01H 9/008; G01H 11/00;
H04B 15/00; G01N 29/00; G06F 19/00
USPC .................................. 702/56; 367/8; 73/646
See application file for complete search history.

(56) References Cited

U.S. PATENT DOCUMENTS

| | | | |
|---|---|---|---|
| 5,712,805 A | 1/1998 | Wang et al. | |
| 6,615,143 B2* | 9/2003 | Wu | 702/39 |
| 2005/0150299 A1* | 7/2005 | Wu | 73/587 |
| 2005/0238177 A1* | 10/2005 | Bruno et al. | 381/18 |

(Continued)

FOREIGN PATENT DOCUMENTS

JP         H0921863 A         1/1997

OTHER PUBLICATIONS

Sean F. Wu, "Hybrid near-field acoustic holography", J, Acoust. Soc. Am. 115(1), Jan. 2004.*

(Continued)

*Primary Examiner* — John Breene
*Assistant Examiner* — Ruihua Zhang
(74) *Attorney, Agent, or Firm* — Nixon Peabody LLP

(57) ABSTRACT

Disclosed herein is a method of reconstructing a sound field. The method comprises receiving measured values indicative of a first acoustic quantity measured at a set of measurement locations; defining a set of virtual source locations; and computing a second acoustic quantity for at least one target location from one or more wave functions each representative of a respective sound field originating from a respective one of the defined set of virtual source locations; wherein the one or more wave functions are weighted by respective one or more weighting factors, and wherein computing comprises determining the one or more weighting factors from a least-norm fit of the one or more wave functions to the received measured values.

18 Claims, 3 Drawing Sheets

(56) References Cited

U.S. PATENT DOCUMENTS

| | | |
|---|---|---|
| 2006/0080418 A1 | 4/2006 | Wu |
| 2007/0160216 A1* | 7/2007 | Nicol et al. .................. 381/17 |
| 2007/0189550 A1* | 8/2007 | Wu .............................. 381/94.1 |

OTHER PUBLICATIONS

N. Valdivia, et al., "Study of the comparison of the methods of equivalent sources and boundary element methods for near-field acoustic holography", J. Acoust. Soc. Am. 120 (6), Dec. 2006.*

Wang, et al., "Helmholtz equation-least-squares method for reconstrucitng the acoustic pressure filed", J. Acount, Soc. Am. 102(4), Oct. 1997.*

Cho et al., "Source visualization by using statistically optimized near-field acoustical holography in cylindrical coordinates", J. Acount, Soc. Am. 118(4), Oct. 2005.*

Sean Wu, "On reconstruction of acoustic pressure fields using the Helmholtz equation least squares method", J. Acount, Soc. Am. 107(5), May 2000.*

First Office Action corresponding to co-pending Chinese Patent Application No. 200980126438.1, filed Jun. 26, 2009; Dated Feb. 29, 2012; (15 pages).

Sean, F. Wu; On reconstruction of acoustic pressure fields using the Helmholtz equation least squares method; Department of Mechanical Engineering; Dated May 2000 (12 pages).

Jorgen Hald; Patch Holography in Cabin Environments Using a Two-Layer Handheld Array with an Extended Sonah Algorithm; Bruel & Kjaer SVM A/S; Dated May 30-Jun. 1, 2006; (8 pages).

Jorgen Hald; Patch Near-Field Acoustical Holography Using a New Statistically Optimal Method; Innovations, R&D, Bruel & Kjaer Sound & Vibration Measurement A/S; Dated Aug. 25-28, 2003 (8 pages).

Thorkild B. Hansen; Spherical Expansions of Time-Domain Acoustic Fields: Application to Near-Field Scanning; Rome Laboratory ERCT, Hanscom AFB; Dated Aug. 1995 (12 pages).

Jorgen Hald; Reduction of Spatial Windowing Effects in Acoustical Holography; Bruel & Kjaer A/S; Dated 1994; (4 pages).

Finn Jaconsen and Virginie Jaud; Statistically Optimized Near Field Acoustic Holography Using an Array of Pressure-Velocity Probes; Dated Mar. 2007; (9 pages).

Rolf Steiner and Jorgen Hald; Near-Field Acoustical Holography Without the Errors and Limitations Caused by the Use of Spatial DFT; McKinsey and Bruel & Kjaer Sound & Vibration Measurement A/S; Dated Jun. 2001; (11 pages).

Nicolas Valdivia and Earl G. Williams; Implicit Methods of Solution to Integral Formulations in Boundary Element Method Based Nearfield Acoustic Holography; Naval Research Laboratory; Dated Sep. 2004; (14 pages).

Zhaoxi Wang and Sean F. Wu; Helmholtz Equation-Least-Squares Method for Reconstructing the Acoustic Pressure Field; Department of Mechanical Engineering, Wayne State University; Dated Oct. 1997; (13 pages).

Earl G. Williams, J. D. Maynard and Eugen Skudrzyk; Sound Source Reconstructions Using a Microphone Array; Department of Physics and The Applied Research Laboratory; Dated Jul. 1980; (5 pages).

Office Action corresponding to co-pending Japanese Patent Application No. 2011-517084;Dated Jul. 2, 2013; (4 pages).

* cited by examiner

METHOD FOR RECONSTRUCTING AN ACOUSTIC FIELD

CROSS-REFERENCE TO RELATED APPLICATIONS

This application is a U.S. National Stage of International Application No. PCT/EP2009/058036, filed Jun. 26, 2009, which claims the benefit of Danish Patent Application No. PA 2008 00956, filed on Jul. 8, 2008, both of which are incorporated herein by reference in their entireties.

TECHNICAL FIELD

The present invention relates to the reconstruction of an acoustic field.

BACKGROUND

Near-field Acoustical Holography (NAH) is a very useful tool for 3D visualization of sound radiation and for precise noise source localization based on measurements over a surface near the sound source. Its ability to reconstruct also the evanescent wave components ensures a very high spatial resolution.

A known Near-field Acoustical Holography method is based on regular-grid measurements across a level surface in a separable coordinate system, allowing the NAH calculation to be performed by spatial Discrete Fourier Transform (DFT), see e.g. E. G. Williams, J. D. Maynard, and E. J. Skudrzyk, "Sound source reconstruction using a microphone array," J. Acoust. Soc. Am. 68, 340-344 (1980). Due to the use of DFT, the processing is very fast, but a side effect of using the DFT includes severe spatial windowing effects unless the measurement area fully covers the areas with high sound pressure. In some cases this requirement on the measurement area cannot be fulfilled, and in many cases the necessary size becomes prohibitively large.

A set of techniques have been proposed to reduce the spatial windowing effects, while still maintaining the DFT spatial processing but at the cost of an increased complexity and computational demands, see e.g. J. Hald, "Reduction of spatial windowing effects in acoustical holography," Proceedings of Inter-Noise 1994. Typically an iterative procedure is first used to extrapolate the measured sound pressure outside the measured area, followed by application of a DFT based holography method on the extended data window.

Other methods have been proposed that seek to avoid the use of spatial DFT and to provide a reduction in the required measurement area.

One such method is the Helmholtz' Equation Least Squares (HELS) method which uses a local model of the sound field in terms of spherical wave functions, see e.g. U.S. Pat. No. 6,615,143, Z. Wang and S. F. Wu, "Helmholtz equation-least-squares method for reconstructing the acoustic pressure field," J. Acoust. Soc. Am, 102(4), 2020-2032 (1997); or S. F. Wu, "On reconstruction of acoustic fields using the Helmholtz equation-least-squares method," J. Acoust. Soc. Am, 107, 2511-2522 (2000). However, since only spherical wave functions with a common origin are used to represent the sound field, errors will be introduced in the sound field reconstruction on the source surface, unless the source surface is also spherical and centered in the same origin. Another drawback of the above prior art method is that it requires a large number of measurement positions to obtain a sufficiently accurate model. A third drawback is that traditional regularization methods like Tikhonov regularization do not work properly. Instead, the above prior art method applies a computationally expensive iterative search for an optimal truncation of the spherical wave expansion combined with a least squares solution without regularization.

Another previously proposed method is the Statistically Optimized Near-field Acoustic Holography (SONAH) method disclosed in R. Steiner and J. Hald, "Near-field Acoustical Holography without the errors and limitations caused by the use of spatial DFT," Intern. J. Acoust. Vib. 6, 83-89 (2001). However, this prior art method is based on plane wave functions and does not allow for accurate reconstruction of the sound field on non-planar source surfaces.

SUMMARY

According to a first aspect, disclosed herein is a method of reconstructing a sound field based on a set of measurements, the method comprising:
  receiving measured values of a first acoustic quantity measured at a set of measurement locations;
  defining a set of virtual source locations and a set of wave functions, each wave function being representative of a respective sound field originating from a respective one of the defined set of virtual source locations;
  computing a second acoustic quantity at a target location from a superposition of the set of wave functions multiplied by respective expansion coefficients; wherein computing comprises determining the one or more expansion coefficients from a least-norm fit of the superposition of the set of wave functions to the received measured values.

The inventors have realised that embodiments of the method and apparatus described herein allow an accurate reconstruction of a sound field even when the number of measurement points is smaller than the total number of wave functions used in the acoustic model. In particular, embodiments of the method described herein use the least-norm solution formula for determining the expansion coefficients of the acoustic model so as to handle underdetermined estimation problems, i.e. where the number of unknown expansion coefficients is larger than the number of measurements. Consequently, an efficient technique is provided that allows a detailed modelling even of sources with complicated surface geometries with a relatively small number of measurements and at relatively low computational cost.

Generally, the term reconstructing a sound field refers to any process for predicting, e.g. by computation/estimation of approximate values one or more acoustic quantities, e.g., sound pressure, particle velocity, intensity and/or sound power, in a set of points, on the basis of measurements of the same or different acoustic quantity/quantities in a different (or the same) set of points.

It will be appreciated that each virtual source location may be the origin for one or more wave functions, i.e. several wave functions may originate in one virtual source location.

According to a second aspect, disclosed herein is a method of reconstructing a sound field at least one target location, the sound field being generated by at least one sound source, the method comprising:
  receiving one or more measured values of a first acoustic quantity measured at a set of measurement locations;
  defining a set of virtual source locations and a set of wave functions each representative of a respective sound field originating from a respective one of the defined set of virtual source locations;
  computing a second acoustic quantity for at least one target location from a superposition of the set of wave functions multiplied by respective expansion coefficients, the measurement locations and the at least one target location being located in a first source-free region, and the virtual source locations being located outside the first source-free region;
wherein defining comprises defining a respective scaling surface for each of the defined virtual source locations, the scaling surface being located outside the first source-free region; and scaling each of the set of wave functions to have a predetermined amplitude on the scaling surface of the corresponding virtual source location.

Hence, in embodiments of the method described herein the wave functions, e.g. multipole and/or spherical wave functions of different order around the respective virtual sound source locations, are scaled to have equal, or at least approximately equal, amplitude on scaling surfaces around their respective virtual sound sources. In particular, all wave functions having the same virtual source location as their origin may be scaled on the same scaling surface around that virtual source location. The scaling surfaces may be spherical surfaces having their centre in the corresponding virtual source location. In particular, when the scaling surfaces are spherical surfaces all having the same radius, the wave functions are scaled to have the same amplitude at a predetermined distance from their respective virtual source location (i.e. the wave function origins).

Hence, embodiments of the method described herein apply a scaling of the wave functions in such a way that functions with stronger decay in the model region are scaled to lower amplitudes in the same region, in particular at the measurement locations. The scaling scheme described herein is particularly useful when the set of wave functions comprises multipole and/or spherical wave functions of different order, e.g. in an embodiment with a single virtual source location and a plurality of wave functions defined with the single virtual source locations as an origin. Since the wave functions have (approximately) equal amplitudes on the respective scaling surfaces, those wave functions with a stronger decay have reached a lower level when entering the first source-free region, in particular at the measurement locations, compared to those that have a weaker decay. Since these fast decaying waves have smaller amplitudes at the measurement locations, they will get a lower weight in the system of equations set up for calculation of the expansion coefficients, and they will therefore be the first to be cut away by a regularization process. This type of behaviour is desirable for the regularization methods to be able to retain field components well above the noise floor of the measured data and to cut away wave components that have decayed to so low levels that they are dominated by measurement inaccuracies. It is therefore an advantage of this scaling that it allows regularization schemes to perform optimal filtering, thereby allowing for a more accurate reconstruction.

It will be appreciated that embodiments of the scaling described herein may be used both in connection with the HELS method and with the least-norm method described herein.

The sound source may be any object emitting or reflecting acoustic radiation. The object may be arbitrarily shaped, and the sound may be any kind of sound, e.g. noise, audible sound, inaudible sound such as ultra-sound or infra-sound, etc., or a combination thereof.

The first acoustic quantity at a measurement location may be measured by any suitable acoustic measuring device, e.g. a microphone, a hydrophone, a pressure gradient transducer, a particle velocity transducer, etc. or a combination thereof. In some embodiments, the measurement is performed by an array of acoustic measurement devices, e.g. a set of such devices arranged in a regular or irregular grid, for example, a two- or three-dimensional grid. The measured first acoustic quantity may be a sound pressure, a sound pressure gradient, a particle velocity, and/or the like.

The reconstructed sound field may be represented by any suitable data set indicative of a spatial distribution of a second acoustic quantity such as a sound pressure, a sound intensity or a particle velocity. The first and second acoustic quantities may be the same quantity or different quantities. The data set may be represented as a map, e.g. a map of the second acoustic quantity directly on the actual surface geometry of an arbitrary surface, e.g. a surface of a sound/noise emitting object to be analysed or a surface close to the object.

Since particle velocity on top of a hard surface corresponds closely to the actual vibration of the surface itself, the results can directly be used for correlation with structural models. In some embodiments the sound field is represented by a conformal map. In some embodiments, the sound field parameters are reconstructed and mapped on a surface, typically near the source surface. Alternatively or additionally, for example spectra at single positions in the 3D region of validity of the wave function representation may be reconstructed.

A least-norm fit of the one or more scaled wave functions to the received measured values generally refers to a numerical process of determining a set of complex expansion coefficients that solve a set of linear equations where the determined set of factors has an at least approximately minimal norm, i.e. in a situation where the set of equations does not have a unique solution, the process determines a solution with a minimal norm among the set of possible solutions. The set of linear equations requires, at the measurement locations, the sum of wave functions, each multiplied with a respective expansion coefficient, to be equal the measured values. The expansion coefficients are complex numbers representing an amplitude and a phase. It has been realised by the inventors that an accurate reconstruction of the sound field may be achieved even when the solution to the set of equations is not unique, and the process determines a least-norm solution.

It is a further advantage of embodiments of the method described herein that the computation of the second acoustic quantity from a least-norm solution formula may be based on the computation of correlation functions indicative of respective correlations of the set of wave functions at a first one of said measurement locations with the set of wave functions at a second location, the second location being chosen from the target location and the measurement locations. In particular, the least-norm solution formula involves a square correlation matrix having a dimensionality equal to the number of measurement locations, wherein each element of the square correlation matrix is indicative of a correlation of the set of wave functions evaluated at respective measurement locations.

The measurement locations and the at least one target location may be located in a first source-free, homogeneous region, and the virtual source locations may be located outside the first source-free region, typically in a predetermined distance from the boundary of the first source free region. Each virtual source location serves as an origin of one or more of the set of wave functions.

In some embodiments, the first source-free region is defined by a first surface, the at least one sound source is comprised in an object having an object surface, and at least a part of the object surface defines at least a part of the first surface. Hence the object surface may at least partly define the first source-free measurement and reconstruction domain in which the sound field may be reconstructed, thereby allowing at least some target positions to be located on the object surface. The virtual source locations are defined outside the measurement and reconstruction domain.

For example, the virtual source locations, i.e. the origins of respective ones of the wave functions, may be defined at a predetermined spatial relation to the object surface around the sound source to be analysed. For example, the virtual sources may be defined at locations all having a predetermined distance from the object surface, thereby providing an accurate mapping of the surface. Generally, the object surface may have a first side facing the sound source and the virtual source locations and a second side facing the measurement and target locations. However, in some embodiments some virtual source locations may be located outside the source object, but outside the first source-free region.

The wave functions may be a suitable set of elementary wave functions, e.g. an orthogonal set of basis functions. The elementary wave functions each satisfy the so-called Helmholtz equation or reduced wave equation in the reconstruction region. In some embodiments, the elementary wave functions are spherical wave functions. In some embodiments, for each virtual source location a limited set of scaled spherical wave functions is used, e.g. to define a finite multipole expansion, i.e. a linear combination of a finite number of multipole basis functions, e.g. chosen from a monopole point function, a set of dipole point functions (with different orientations), and/or the like. In particular, the process may compute the second acoustic quantity directly or indirectly from a linear combination of the elementary wave functions, each elementary wave function being weighted by a respective expansion coefficient. For example, the computation may comprise computing the spatial derivatives of the wave functions. If the linear combination of wave functions provides the pressure, then the particle velocity can be obtained from the weighted sum of spatial derivatives of the wave functions (using the same expansion coefficients, but with an additional frequency dependent constant factor). Also, the sound intensity may be calculated from the pressure and particle velocity.

It is noted that features of the methods described above and in the following may be implemented at least in part in software or firmware and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

Embodiments of the present invention can be implemented in different ways, including the methods described above and in the following, systems, devices and product means, each yielding one or more of the benefits and advantages described in connection with one of the first-mentioned methods, and each having one or more embodiments corresponding to the embodiments described in connection with one of the first-mentioned methods and/or as disclosed in the dependent claims.

In particular, embodiments of a processing device for reconstructing a sound field comprise an interface for receiving measured values of a first acoustic quantity measured at a set of measurement locations, and a processing unit.

A system for reconstructing a sound field may comprise an apparatus as disclosed above and in the following and a set of transducers for measuring the first acoustic quantity at a set of measurement locations, and connectable in communication connection to the apparatus so as to forward the measured values to the apparatus.

A computer program may comprise program code means adapted to cause a data processing system to perform the steps of the method disclosed above and in the following when the program code means are executed on the data processing system. The computer program may be stored on a storage means or embodied as a data signal. The storage means may comprise any suitable circuitry or device for storing data, such as a RAM, a ROM, an EPROM, EEPROM, flash memory, magnetic or optical storage device, such as a CD ROM, a DVD, a hard disk, and/or the like.

BRIEF DESCRIPTION OF THE DRAWINGS

The above and other aspects will be apparent and elucidated from the embodiments described in the following with reference to the drawing in which.

Throughout the drawings, equal reference signs refer to equal or corresponding elements, features, or components, wherever feasible.

DETAILED DESCRIPTION

Figure 1:
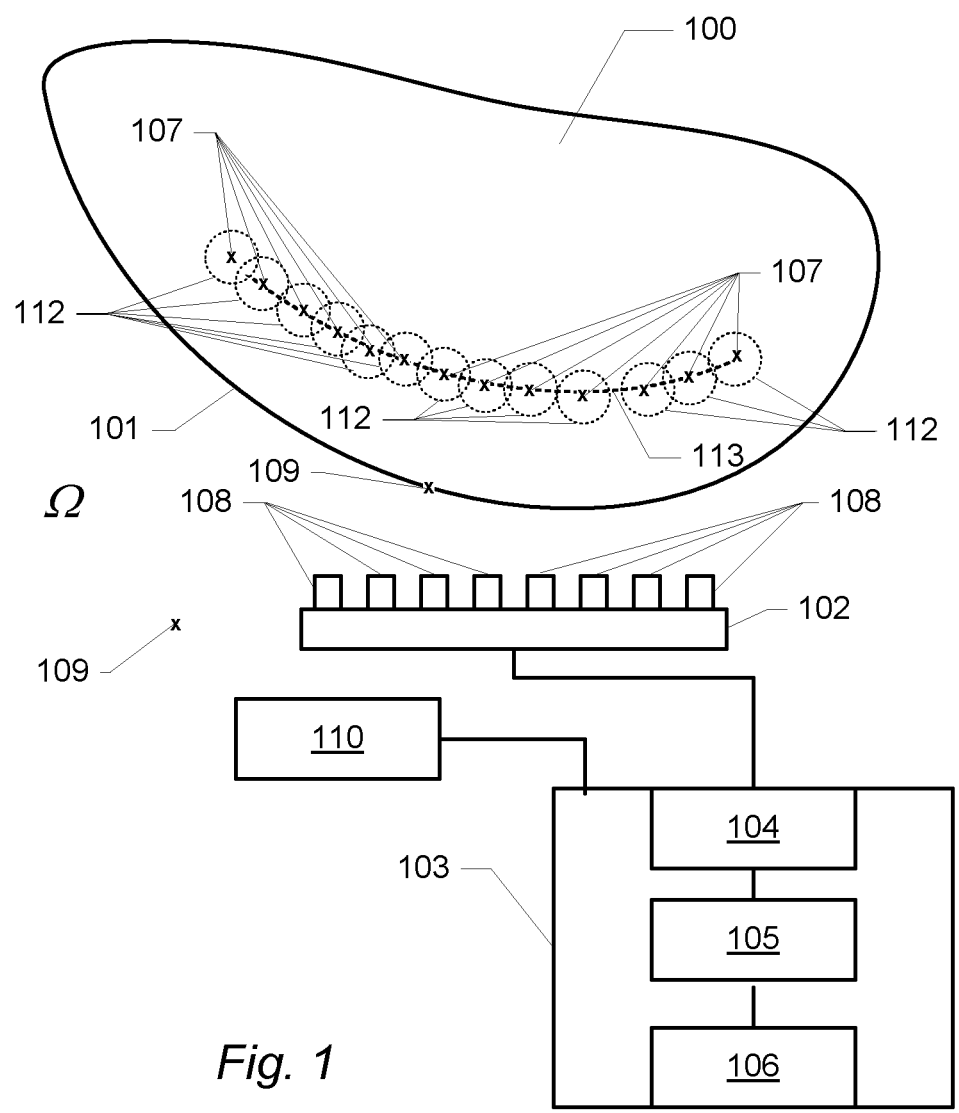
FIG. 1 shows a schematic block diagram of a system for reconstructing a sound field.

FIG. 1 shows a schematic block diagram of a system for reconstructing a sound field. The system comprises a set of acoustic receivers 108 and an analysing unit 103 connected to the acoustic receivers.

In the following the acoustic receivers 108 will also be referred to as transducers. Nevertheless, it will be appreciated that the acoustic receivers may be microphones, hydrophones or any other suitable device for measuring an acoustic property such as sound pressure, sound pressure gradient, particle velocity, and/or or other linear quantities, or a combination thereof. In the embodiment of FIG. 1, the transducers 108 are implemented as an array 102 of transducers where the transducers 108 are arranged in a regular grid, e.g. a 1-, 2-, or 3-dimensional grid. While an arrangement in a regular grid allows for an efficient numerical implementation, other geometries may be used. In some embodiments, even a single transducer may be used to take measurements at different points in series. Such a serial measurement may e.g. be used in situations where the sound source is stationary, and where the phase can be measured relative to one or several reference signals. The number of transducers and the geometry of the array, e.g. the inter-transducer spacing, may be chosen in accordance with the size and geometric complexity of the object to be analysed, the frequency range of interest, and the desired spatial resolution.

The transducer array 102 is connected to the analysing unit 103 such that the transducers 108 can forward the measured signals to the analysing unit, e.g via a wired or wireless signal connection.

The analysing unit 103 includes interface circuitry 104 for receiving and processing the measured signals from the transducer array 102, a processing unit 105 in data communication with the interface circuit 104, and an output unit 106 in data communication with the processing unit 105.

The interface circuit comprises signal processing circuitry suitable for receiving the output signals from the transducers 108 and for processing the received signals for subsequent analysis by the processing unit 105. The interface circuit 104 may comprise one or more of the following components: one or more pre-amplifiers for amplifying the received signals, one or more analogue-to-digital (ND) converters for converting the received signal into a digital signal, one or more filters, e.g. bandwidth filters, and/or the like. For example, the interface circuit may provide as output data the amplitude and phase as a function of frequency for each of the transducers. In some embodiments, the interface unit may perform a simultaneous time data acquisition, and all further processing may then be done by the processing unit 105, including transform of data to frequency domain, typically using FFT.

The processing unit 105 may be a suitably programmed microprocessor, a central processing unit of a computer, or any other suitable device for processing the signals received from the interface unit 104, e.g. an ASIC, a DSP, and/or the like. The processing unit is adapted to process the transducer signals received via the interface circuit 104 so as to compute a reconstructed sound field as described herein.

The output unit 106 may comprise a display or any other suitable device or circuitry for providing a visual representation of the reconstructed sound field, e.g. a printer and/or printer interface for providing a printed representation. Alternatively or additionally, the output unit 106 may comprise any suitable circuitry or device for communicating and/or storing data indicative of the reconstructed sound field, such as a RAM, a ROM, an EPROM, EEPROM, flash memory, magnetic or optical storage device, such as a CD ROM, a DVD, a hard disk, a wired or wireless data communications interface, e.g. an interface to a computer or telecommunications network, such as a LAN, a wide area network, and internet, and/or the like.

The analysing unit 103 may be implemented as a suitably programmed computer, e.g. a PC including a suitable signal acquisition board or circuit.

The system may further comprise a suitable position detection device 110 connected to the analysing unit 103, for detecting the position of the transducers 108, e.g. relative to a reference coordinate system. The position detecting device may include a test bench, frame, or other structure, to which the transducer array can be mounted at predetermined positions and orientations, and/or where the position and orientation of the array may be measured manually or automatically, e.g. by suitable sensors. Alternatively, the transducer array 102 may include a position detecting device, or at least a part thereof. For example, the transducer array may include a coil of a magnetic field position detection system, a gyroscope, an optical position detection system and/or the like.

During operation, the transducer array 102 is positioned near a surface 101 of an object 100 that emits acoustic radiation and for which a sound field is to be reconstructed. The number of transducers, the geometry of the array, e.g. the inter-transducer spacing, and the distance between the array and the object surface 101 may be chosen in accordance with the size and geometric complexity of the object to be analysed, the frequency range of interest, and the desired spatial resolution. For example, for the reconstruction of sound fields of a car engine an 8×8 matrix array of microphones with e.g. 3 cm interelement spacing may be used. It will be appreciated, however, that other types and sizes of arrays may be used as well.

The position of the array 102 is determined, e.g. by a position detection device 110, and fed into the analysing unit 103. The transducers 108 of the array 102 measure sound pressure or another suitable acoustic quantity at the determined position, and the resulting transducer signals are sent to the analysing unit 103.

For example, the transducer array may be a hand-held array with integrated position detection device, thus allowing measurements at different accessible positions distributed around the object and reducing the time spent on special preparation of the source to the test is minimal. For example, when mapping a sound source, e.g. a compressor, a pump, or other machine, on a test bench, the time required for changing the test set-up, e.g. routing of fuel lines, electronic wiring etc., to provide unhindered access to a complete face is reduced if not eliminated. Another typical application may be inside a car cabin, where a 3D array grid may be used to be able to distinguish sources in all directions, e.g. a dual layer array (e.g. including 8×8×2 sensors) may be used.

The analysing unit 103 computes a reconstructed sound field from the input data, and stores and/or outputs a representation of the reconstructed sound field.

An embodiment of a process for generating a reconstructed sound field will now be described with reference to FIG. 2 and continued reference to FIG. 1.

In step S1, the process receives coordinates of a set of positions $r_i$, i=1, 2, . . . , I and respective complex time-harmonic sound pressures $p(r_i)$ measured at the set of positions $r_i$. The $r_i$ represent coordinate vectors of the positions relative to a suitable coordinate system, e.g. the transducer positions as determined from the input received from position detection device 110. For the purpose of the present description, it will be assumed that the positions $r_i$ are located in a source-free region $\Omega$ occupied by a homogeneous fluid, such as air or water. The complex time-harmonic sound pressures $p(r_i)$ may be determined from the received transducer signals in a variety of ways. For example, a single simultaneous recording may be made with all transducers, followed by an FFT of all signals which provides a complex (time harmonic) sound field for every FFT line. Alternatively, measurements may be performed of cross spectra from a reference signal to all array transducers and of the auto-spectrum of the reference signal. The cross spectra divided by the square-root of the autospectrum then provides a complex (time harmonic) sound field for every frequency line of the applied spectra. The process of FIG. 2 performs a reconstruction of the sound field in $\Omega$ based on the measured sound pressures.

To do that, in step S2, the process defines a set of elementary wave functions, $\Psi_n$, n=1, . . . , N, capable of representing with a sufficiently high accuracy all sound pressure fields that can exist in $\Omega$:

$$p(r) = \sum_{n=1}^{N} a_n \Psi_n(r), \tag{1}$$

where the $a_n$ are complex weighting factors which will also be referred to as expansion coefficients. The elementary wave functions may be scaled spherical wave functions, or, equivalently, sound fields from multi-pole sources such as monopoles, dipoles and/or quadropoles etc., where these virtual sources are distributed around $\Omega$, but outside $\Omega$. Hence, the process defines a set of virtual source locations 107 outside of the domain $\Omega$ of the field representation. For example, the process may have stored the positions of a set of virtual sources, and/or receive the positions e.g. as a user input, and/or generate the positions in a predetermined geometry, typically following the source surface, and/or the like. In some embodiments, the process may use a single virtual source location, e.g. by defining a set of multi-pole expansion functions of a single virtual source location, while other embodiments may utilise a plurality of virtual source locations, e.g. using a single wave function for each virtual source location. Furthermore, other combinations may be possible. The virtual source locations may be defined to be located on a surface that is conformal or at least near-conformal with the real object surface of the object under investigation. However, the virtual source locations may be positioned in other ways as well. In particular, in the example of FIG. 1, the source-free region Ω is shown to have a boundary that coincides with the object surface 101. Hence, in the example of FIG. 1, the virtual sound sources 107 are all shown inside the object 100. Nevertheless, in alternative embodiments, the region Ω may be defined by a boundary surface that is at least partly different from the object surface, typically a surface that is partly outside the object 100 and partly coincides with the object surface 101. Consequently, in such alternative embodiments, at least some virtual source locations may be located outside the object 100 but still outside Ω. For instance, when using a dual-layer array, the process may define virtual source locations surrounding the array. Such an arrangement may be useful in situations with reflections and/or sources from behind the array.

For each virtual source location the process defines a set of scaled wave functions. For example, for each virtual source location the set of wave functions may be chosen from a limited set of spherical wave functions; it may be noted that apart from a frequency-dependent scaling factor, spherical wave functions and multipole fields are identical.

only the zero'th degree function, corresponding to a monopole point function, of a multi-pole expansion;

only the 1, 2 or 3 first degree functions, corresponding to monopoles, dipoles and quadropoles of a multi-pole expansion.

All elementary wave functions are chosen so as to fulfil Helmholtz' equation in the reconstruction region. In particular, this is the case for spherical wave functions and fields from multipoles, if their origin is outside of the reconstruction region. In some embodiments, the only boundary conditions are the measured field values, but other known boundary conditions could be incorporated, for example a reflective surface.

It is noted that embodiments of the method described herein are also applicable in the underdetermined case, i.e. when the number N of expansion functions is larger than the number I of measurement points, i.e. N>I.

Each wave function has a scaling factor that can depend on frequency and/or origin of the function. The scaling may for example be such that all functions have identical (or at least approximately identical) amplitude at some chosen distance from the virtual source location that serves as their origin, i.e. on a spherical scaling surface 112 around the respective virtual source location 107. The radius of the scaling surfaces 112 is chosen to be smaller than the distance between the virtual source locations 107 and the boundary of the region Ω (or the smallest distance of all such distances). As mentioned above, the boundary may be the object surface 101. Hence, the wave functions $\Psi_n$ may be defined as scaled versions of the standard spherical wave functions. It may be worthwhile noting that this scaling refers to a property of the defined wave functions while the determination of the expansion coefficients is performed based on equations involving the scaled wave functions $\Psi_n$.

The object surface may be an input parameter to the process which may e.g. be obtained in a manner similar to the transducer positions, e.g., from manually measured surface points or from data from a positioning detecting device; alternatively or additionally, the object surface may be measured/determined as a part of the process. It may be the physical surface of the object under consideration. The scaling and source model surfaces are defined by the reconstruction process. The source model surface is a surface on which the virtual source locations 107 are located, while the scaling surfaces 112 are spherical surfaces around the respective virtual source locations on which the scaled wave functions originating from the corresponding virtual source location all have equal amplitude. The source model surface and the scaling surfaces may be defined inside the object, i.e. on the side of the object surface opposite to the measurement domain. Generally, the source model surface and the scaling surfaces may be defined such that scaling surfaces lie entirely outside the region Ω, e.g. inside the object 100. For example, the radius of the scaling surfaces may be smaller than the distance from the source model surface to the object surface. This scaling allows the regularization methods to work properly. In particular, the regularization methods generally work well for models where the wave functions with strong decay have lower amplitudes in the measurement region than the wave functions with weak decay. If the wave functions are not scaled, the higher order multipoles (which are those with strong decays) will have larger amplitudes in the reconstruction region than the lower order functions (which have weak decays), e.g., the monopole and dipole. The purpose of the regularization is to suppress the influence of measurement noise, and this is done by perturbing the system of equations. If the waves are not scaled, the perturbation removes valuable information from the associated matrix stemming from the lower order waves, whereas the scaled version removes more information from the less important higher order terms.

It will be appreciated that, alternatively or additionally to the sound pressure, the process may calculate a different acoustic quantity, e.g. the particle velocity. For example, the particle velocity $u_\chi(r)$ in a direction $\chi$ (e.g. a direction chosen from the x, y or z direction of a Cartesian coordinate system) may be obtained through application of Euler's equation:

$$u_\chi(r) = \frac{-1}{j\omega\rho_0}\frac{\partial p(r)}{\partial \chi} = \frac{-1}{j\omega\rho_0}\sum_{n=1}^{N} a_n \frac{\partial \Psi_n(r)}{\partial \chi} = \sum_{n=1}^{N} a_n \Phi_{\chi,n}(r) \quad (2)$$

where we have introduced the spatial derivatives of the expansion functions:

$$\Phi_{\chi,n}(r) \equiv \frac{-1}{jk\rho_0 c}\frac{\partial \Psi_n(r)}{\partial \chi}, \quad (3)$$

Here, ω is the angular frequency, k=ω/c is the wave-number, c is the propagation speed of sound, $\rho_0$ is the density of the medium (i.e. the fluid), and j is the imaginary unit.

Accordingly, the process may calculate the sound pressure and/or the particle velocity at each of a set of target points r, where the sound field is to be reconstructed. Two examples of a target point are designated 109 in FIG. 1. In many situations, it will be of interest to reconstruct the sound field on the object surface of the object under investigation. For example, the process may calculate the sound pressure at each of a set of grid points of a regular grid. For the purpose of the present description a point for which a reconstructed sound field value is to be calculated will also be referred to as calculation point.

Defining the following vectors containing the expansion coefficients and the wave functions at the calculation position:

$$a \equiv \{a_n\} \equiv \begin{Bmatrix} a_1 \\ a_2 \\ \vdots \\ a_N \end{Bmatrix}, \alpha(r) \equiv \begin{Bmatrix} \Psi_1(r) \\ \Psi_2(r) \\ \vdots \\ \Psi_N(r) \end{Bmatrix}, \beta_\chi(r) \equiv \begin{Bmatrix} \Phi_{\chi,1}(r) \\ \Phi_{\chi,2}(r) \\ \vdots \\ \Phi_{\chi,N}(r) \end{Bmatrix}. \quad (4)$$

allows equations (1) and (2) to be rewritten as:

$$p(r) = a^T \alpha(r) = [\alpha(r)]^T a, \quad (5)$$

$$u_\chi(r) = a^T \beta_\chi(r) = [\beta_\chi(r)]^T a, \quad (6)$$

where the superscript T represents transpose of a matrix or vector.

We define the matrices A and B of wave function values at the measurement positions:

$$B \equiv \{\Psi_n(r_i)\} \equiv \begin{Bmatrix} \Psi_1(r_1) & \Psi_2(r_1) & \cdots & \Psi_N(r_1) \\ \Psi_1(r_2) & \Psi_2(r_2) & & \Psi_N(r_2) \\ \vdots & & \ddots & \vdots \\ \Psi_1(r_I) & \Psi_2(r_I) & \cdots & \Psi_N(r_I) \end{Bmatrix}, A \equiv B^T \quad (7)$$

and the vector p of measured pressures:

$$p \equiv \{p(r_i)\} \equiv \begin{Bmatrix} p(r_1) \\ p(r_2) \\ \vdots \\ p(r_I) \end{Bmatrix}. \quad (8)$$

Hence, in step S3, the process may thus calculate the vector a of expansion coefficients as a regularised least-norm solution of the Helmholtz equation according to:

$$a = B^H (BB^H + \epsilon I)^{-1} p, \quad (9)$$

where the superscript H represents Hermitian (conjugate) transpose of a complex matrix or vector, I is a unit diagonal quadratic matrix of appropriate dimensions, and $\epsilon$ being a regularization parameter which may be calculated from a specified Signal-to-Noise-Ration (SNR) or it can be calculated automatically based on noisy measured data using Generalized Cross Validation (GCV), the L-curve method or other suitable parameter estimation methods. When a SNR is specified, then the parameter may be obtained typically as the average of the diagonal elements in the matrix $BB^H$ multiplied by $10^{\wedge}(SNR/10)$). Alternatively, the maximum diagonal element may be used.

In eqn. (9), a so-called Tikhonov regularization has been applied to the unregularised solution $$a = B^H (BB^H)^{-1} p.$$

However, it will be appreciated that other forms of regularisation may be used.

The equation (9) may be solved by any suitable technique for solving matrix equations and inverting matrices. It will be appreciated that the matrix $BB^H$ is an I×I dimensional matrix, i.e. for I<N the process described herein provides a method which requires relatively few computational resources. Furthermore, even in this underdetermined case, I<N, the process provides a well-defined solution, namely a solution having a minimum norm, in one embodiment a solution having a minimum 2-norm $$\|a\|_2 = \sqrt{\sum_{n=1}^{N} |a_n|^2}.$$

Subsequently, the process may loop through all calculation points and calculate the desired acoustical quantity, e.g. the sound pressure according to eqn. (5) or the particle velocity according to eqn. (6) or both. In particular, in step S4, the process uses equation (5) and/or (6) for a current calculation position. In step S5, the process determines whether there are unprocessed calculation points left. If this is the case, the process returns to step S4, otherwise the process proceeds at step S6, where the set of calculated sound pressures and/or particle velocities are output, e.g. as a graphical representation, as an array of numerical values, and/or in any other suitable format. The sound intensity may easily be obtained from sound pressure and particle velocity.

Figure 2:
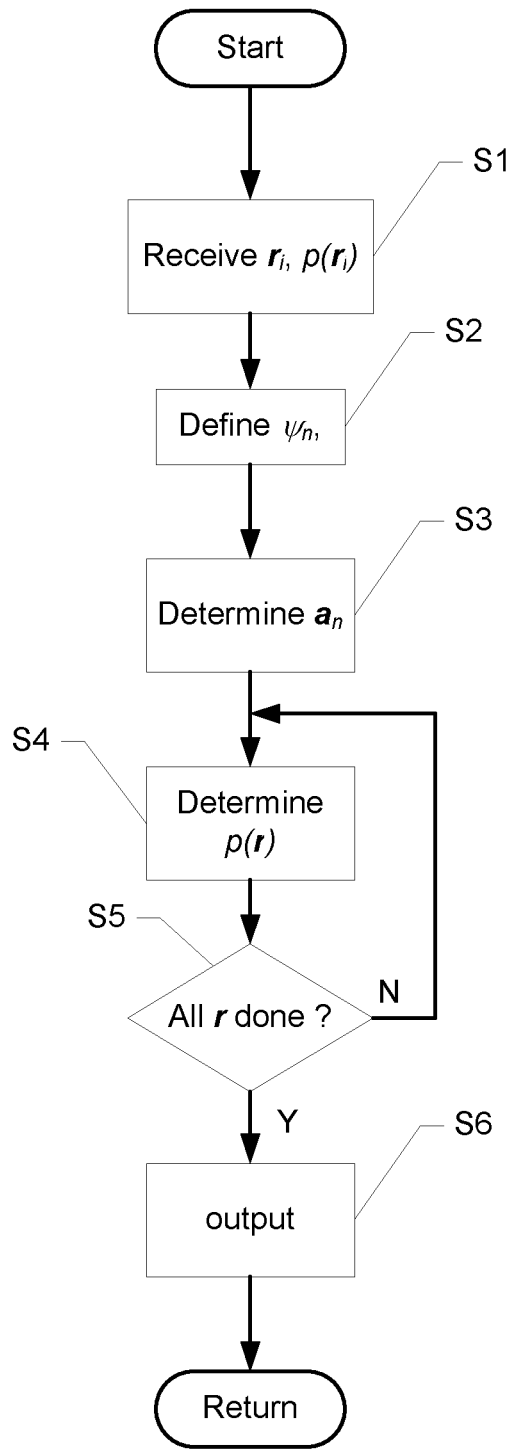
FIG. 2 shows a flow diagram of an embodiment of a process of computing a reconstructed sound field.

In the embodiment of FIG. 2, the process initially calculates the expansion coefficients which then are reused in the calculation for each calculation point. In an alternative embodiment, rather than calculating the expansion coefficient vector a separately, the process may use combination of equations (5) and (9) according to the following formula:

$$p(r) = [\alpha(r)]^T B^H (BB^H + \epsilon I)^{-1} p = [A^H \alpha(r)]^T (BB^H + \epsilon I)^{-1} p \quad (10)$$

which can be also written in the following way using the other form in equation (5):

$$p(r) = p^T (A^H A + \epsilon I)^{-1} A^H \alpha(r) \quad (10)$$

Figure 3:
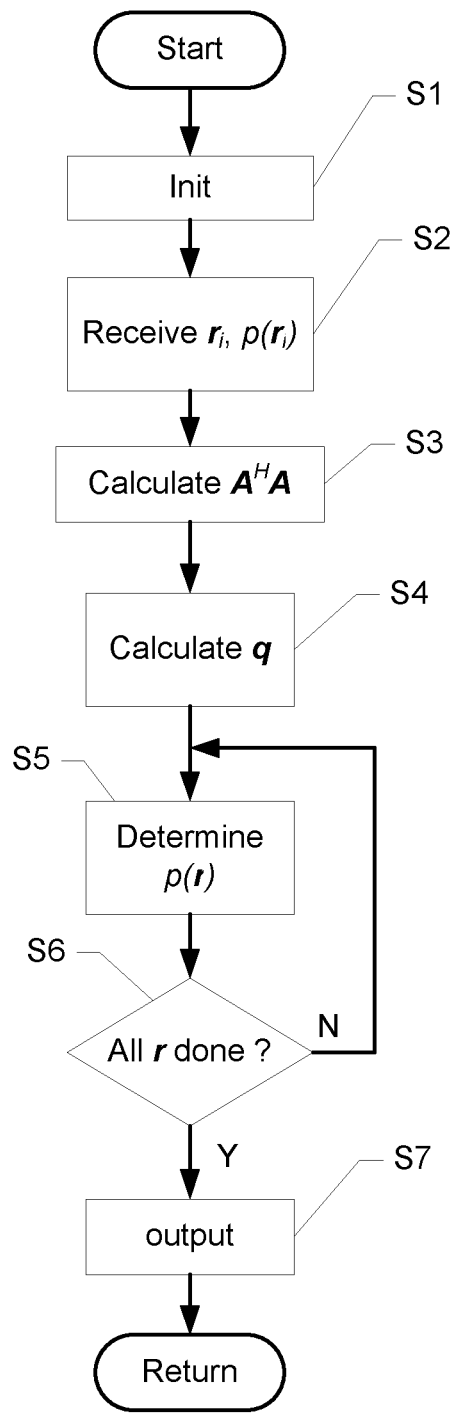
FIG. 3 shows a flow diagram of another embodiment of a process of computing a reconstructed sound field.

In this embodiment, which is illustrated in FIG. 3, the process may thus:

Step S1: In this initialisation step, the process defines a suitable coordinate system 113, a set of virtual source locations 107, and a set of suitably scaled wave functions as described above. The initialisation of step S1 may further comprise the setting of one or more parameters, the regularisation scheme to apply, the type and properties of the measurement system used, e.g. the number of transducers and their relative position in an array, the coordinates of the target positions at which the sound field is to be reconstructed, the acoustic property or properties to be calculated, etc. For example, these and additional or alternative parameters may be user defined via a suitable user-interface of the analysing unit 103.

In step S2, the process receives coordinates of a set of positions $r_i$, i=1, 2, . . . , I and respective complex time-harmonic sound pressures $p(r_i)$ measured at the set of positions $r_i$, as described in connection with FIG. 2.

In step S3, the process calculates $A^H A$ or $BB^H = (A^H A)^T$

In step S4, the process computes the vector q as $$q = (BB^H + \epsilon I)^{-1} p$$

or $$q^T = p^T (A^H A + \epsilon I)^{-1}.$$

Here, $\epsilon$ is a regularization parameter as described above.

The process may loop through all calculation points and calculate the desired acoustical quantity. In particular, in step S5, the process calculates the desired acoustic quantity at a current calculation position r.

For example, in step S5, the process may, for a current calculation position r, compute the vector(s)

$$\phi(r) \equiv A^H \alpha(r)$$

and/or $$\psi_{102}(r) \equiv A^H \beta_\chi(r),$$

and obtain the pressure as $$p(r) = q^T \phi(r)$$

and/or the velocity as $$u_\chi(r) = q^T \psi_\chi(r).$$

In step S6, the process determines whether there are unprocessed calculation points left. If this is the case, the process returns to step S5, otherwise the process proceeds at step S7, where the set of calculated sound pressures and/or particle velocities are output, e.g. as described in connection with FIG. 2.

Although some embodiments have been described and shown in detail, the invention is not restricted to them, but may also be embodied in other ways within the scope of the subject matter defined in the following claims. For example, the embodiments of the method disclosed herein have mainly been described in connection with an embodiment where the measured acoustic quantity is the sound pressure. However, it will be appreciated that in other embodiments a different acoustic quantity may be measured. For instance, instead of the sound pressure the particle velocity $u_\chi(r_i)$ in a direction $\chi$ may be measured at measurement position $r_i$. In such an embodiment, instead of equation (1), equation (2) may be used for position $r_i$ when the system of linear equations to be solved for the expansion coefficient vector a is set up. This means that in the matrices A and B the functions $\Psi_n(r_i)$ are replaced by $\Phi_{\chi,n}(r_i)$ for n=1, 2, ..., N, and in the vector p of Eq. (8) the pressure $p(r_i)$ is replaced by measured particle velocity $u_\chi(r_i)$. Everything else remains unchanged.

The method and apparatus described herein may be used to reconstruct sound fields of a variety of sound/noise sources such as vibrating objects, e.g. when analysing acoustic properties of machines, motors, engines, vehicles such as cars, and/or the like.

Embodiments of the method described herein can be implemented by means of hardware comprising several distinct elements, and/or at least in part by means of a suitably programmed microprocessor.

In the apparatus claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of reconstructing a sound field at at least one target location, the sound field being generated by at least one sound source, the method comprising:
    receiving, at an interface circuit, one or more measured values of a first acoustic quantity measured at a set of measurement locations;
    defining, by a computer, a set of virtual source locations and a set of wave functions each representative of a respective sound field originating from a respective one of the defined set of virtual source locations;
    wherein the defining comprises (a) defining a respective scaling surface for each of the defined virtual source locations, the scaling surface being located outside a first source-free region, and (b) scaling each of the set of wave functions to each have a predetermined amplitude on the scaling surface associated with the virtual source location;
    computing, by the computer, a second acoustic quantity for at least one target location from a superposition of the set of scaled wave functions multiplied by respective expansion coefficients, the measurement locations and the at least one target location being located in the first source-free region, and the virtual source locations being located outside the first source-free region; and
    storing the second acoustic quantity in a memory.

2. A method according to claim 1, wherein computing comprises determining the expansion coefficients from a least-squares fit of the superposition of the set of wave functions to the received measured values.

3. A method according to claim 1, wherein the first source-free region is defined by a first surface; wherein the at least one sound source is comprised in an object having an object surface; and wherein at least a part of the object surface defines at least a part of the first surface.

4. A method according to claim 1, wherein the computing the second acoustic quantity comprises
    computing each of a set of correlation functions, each correlation function being indicative of a correlation of the set of wave functions at a first one of said measurement locations with the set of wave functions at a second location, the second location being chosen from the target location and the measurement locations; and
    computing the second acoustic quantity from at least the computed correlation functions and the one or more measured values.

5. A method according to claim 4, wherein a first one of the set of correlation functions is a square correlation matrix having a dimensionality equal to the number of measurement locations, and wherein each element of the square correlation matrix is indicative of a correlation of the set of wave functions evaluated at respective measurement locations.

6. A method according to claim 1, wherein each of the one or more wave functions is a solution of the Helmholtz equation.

7. A method according to claim 6, wherein each of the set of wave functions is chosen from a spherical wave function, a multipole wave function, a monopole wave function, a dipole wave function.

8. A method according to claim 3, wherein the object surface defines a first spatial domain including the measurement locations and the target location, and a second spatial domain, different from the first spatial domain, the second spatial domain including the virtual source locations.

9. A method according to claim 8, wherein all virtual source locations have the same distance from the object surface.

10. A method according to claim 1, wherein the measurement locations are arranged in a regular grid.

11. A method according to claim 1, wherein the first acoustic quantity is chosen from a sound pressure, a particle velocity, a sound pressure gradient, and a combination thereof.

12. A method according to claim 1, wherein the second acoustic quantity is chosen from a sound pressure, a particle velocity, and a sound intensity.

13. A processing apparatus for reconstructing a sound field at at least one target location, the sound field being generated by at least one sound source, the processing apparatus comprising:
an interface for receiving measured values of a first acoustic quantity measured at a set of measurement locations; and
a processing unit configured to:
define a set of virtual source locations and a set of wave functions each representative of a respective sound field originating from a respective one of the defined set of virtual source locations;
for each of the defined virtual source locations, define a respective scaling surface located outside a first source-free region;
scale each of the set of wave functions to each have a predetermined amplitude on the scaling surface associated with the virtual source location; and
compute a second acoustic quantity for at least one target location from a superposition of the set of scaled wave functions multiplied by respective expansion coefficients, the measurement locations and the at least one target location being located in the first source-free region, and the virtual source locations being located outside the first source-free region.

14. The processing unit of claim 13 in combination with a set of transducers for measuring a first acoustic quantity at a set of measurement locations and connectable in communication connection to the apparatus so as to forward the measured acoustic quantity to the processing apparatus.

15. The processing apparatus of claim 13 used for reconstructing sound fields generated by noise sources of a vehicle.

16. The method according to claim 1, wherein the total number of wave functions is larger than the number of measurement locations, and wherein the computing comprises determining the expansion coefficients from a least-norm fit of the superposition of the set of wave functions to the received measured values.

17. The method according to claim 1, wherein the first acoustic quantity is the same as the second acoustic quantity.

18. The method according to claim 1, wherein each of the wave functions is scaled to have the predetermined amplitude on the scaling surface at a predetermined distance from the corresponding virtual source location.

* * * * *